Oct. 8, 1946.   E. BODMER   2,409,013

REGULATING DEVICE FOR FRICTION-CONES CLUTCHES

Filed Oct. 9, 1944

INVENTOR
ERNEST BODMER,
BY [signature]
ATTORNEY

Patented Oct. 8, 1946

2,409,013

UNITED STATES PATENT OFFICE 2,409,013

REGULATING DEVICE FOR FRICTION-CONE CLUTCHES

Ernest Bodmer, Geneva, Switzerland

Application October 9, 1944, Serial No. 557,817
In Switzerland October 27, 1943

3 Claims. (Cl. 192—111)

Various regulating devices are at present in use for bringing nearer together the cones in a friction clutch, in a gradual manner as they wear out. One of the best known generally used constructions includes a screw-nut having two threads screwing in opposite directions one to the other. One of these two threads is engaged in the driven member of the clutch, while the other is engaged in the element carrying the driven cone, this element being held angularly in regard to the driven member. On the other hand, the axial position of this element in regard to the driven member can be modified by the angular displacement of the screw-nut, means being provided for fixing the axial position of this element, said means usually consisting of a bolt automatically fastening the angular position of the screw-nut.

It is obvious that the axial position of this element determines the axial position of the driven cone in regard to the driving cone and therefore determines the specific pressure fastening the two cones the one against the other. This adjusting device, which covers all the necessary requirements for efficient operation, has however a serious disadvantage. That is to say, in order to adjust the clutch parts, the presence of two men is required, because it is necessary to (1) hold the bolt of the screw-nut in disengaged position; (2) hold the driven part in a fixed position; and (3) turn the screw-nut.

It is possible, in order to facilitate the regulating of the clutch, to provide for instance a screw-nut with a sliding bolt or bayonet, viz., a screw-nut which can be opened and closed by hand. The devices supplied with such screw-nuts are however not in favor, because, in case of omission to close the screw-nut after adjusting, the starting of the machine may cause damage to certain parts of the clutch and in any case cause maladjustment of the latter.

The regulating device for friction-cone clutches of the present invention eliminates this disadvantage, because it is provided with annular adjusting means turning freely in regard to one of the parts of the clutch, but retained axially in regard to the latter, and the angular displacements of which cause the axial displacements of an annular support restrain angularly in regard to the said part of the clutch carrying the friction-cone, together with means for moving the annular adjusting means, and means for locking at least one of the said annular means to fix or set the axial position of the said friction-cone.

The attached drawing shows schematically as an example a form of carrying out a regulating device according to the present invention.

Figure 1:
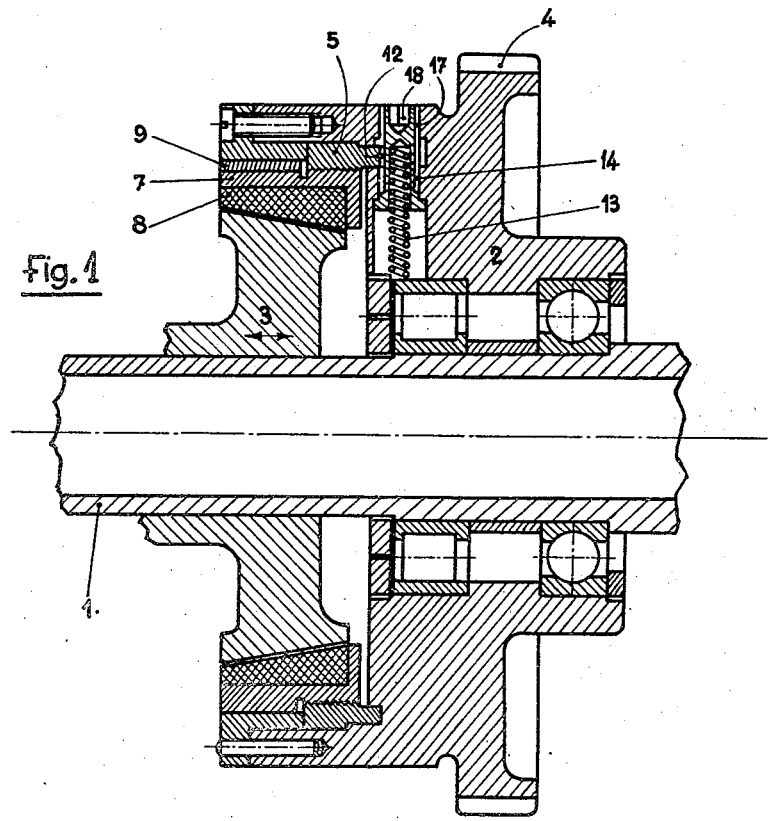
Figure 1 is an axial sectional view.

In the drawing, 1 is the shaft on which are co-axially mounted the female or driving clutch member 2 and the male or driven clutch member 3 of the friction-cone clutch. Driving member 2 is mounted loose on shaft 1 by means of ball-bearings and is set in motion by a chain (not shown) engaged in gear 4. This driving member 2 is maintained in a fixed axial position relative to shaft 1. The driven part 3 is fixed angularly on the shaft 1 but can slide along the same.

The female driving member 2 carries an annular adjusting ring having threads on its inner face to form a screw nut 5 retained axially but able to turn freely with respect to said member 2. This ring is placed in a recess in the male or driving member of the clutch and has its inner threads engaging with mating threads of an annular support 7 slidably supported in the flange portion of the female clutch member and carrying the friction cone 8 of the female or driving clutch member. This ring-like support 7 is restrained angularly relative to the member 2 of the clutch by a spline 9 fixed to the latter and engaged in groove 10 of the friction cone supporting ring 7. Thus, by turning the screw nut 5 relative to the member 2 of the clutch, an axial displacement of ring 7 is effected with respect to said member 2 and also toward the cone 8.

It will be apparent that the mechanical connection between the adjusting ring and the annular support 7 may be constituted by any known device, for instance, an helicoid groove, cog, etc., enabling rotary motion to be translated into rectilinear motion. However, in the preferred form of the embodiment shown in the drawing the device for both locking or moving the adjusting ring or screw nut is formed by an actuator in the form of an elongated pinion 11. The teeth of the pinion 11 always engage in the rack teeth 12 cut in one of the frontal faces of the screw nut 5, and when the elongated pinion is projected forwardly by the spring 13 in the radial bore 14 the teeth of the pinion engage the locking teeth 17 cut in the extreme outer part or mouth of the bore 14. The pinion 11 is retained in the bore 14 against outward movement under pressure of the spring 13 by the shoulder 15 at the inner end of the pinion which abuts against the shoulder 16 of the bore.

From the foregoing it will be apparent that when the elongated pinion 11 is in its fully projected position the teeth of said pinion are not only engaged with the teeth 12 of the screw nut but are also engaged with the locking teeth 17 in the extreme outer part or mouth of the bore 14. When this condition prevails the screw nut is therefore locked and cannot be displaced angularly and likewise the axial position of ring 7 and cone 3 are clearly fixed.

Figures 2, 3:
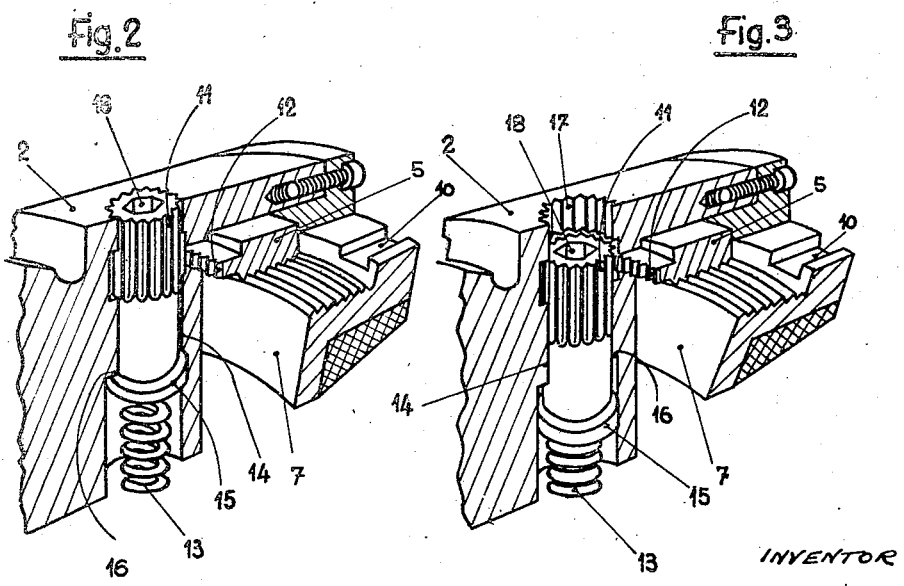
Figure 2 is a partial elevational perspective view with parts cut away, the annular adjusting means being locked.
Figure 3 is a view similar to Fig. 2, the adjusting means being unlocked.

In order to adjust the cone 8, it is only necessary to introduce a suitable tool or key (not shown) into a polygonal or non-circular socket 18 in the accessible face of the pinion 11 and to exert an axial pressure on the latter to move it against the force of the spring 13, from the position shown in Fig. 2 to that shown in Fig. 3. In the latter figure the pinion is shown as disengaging the locking teeth 17 and it is then possible, by manually turning the key, to cause the freed pinion to produce rotary movement of the screw nut, thereby causing lateral or rectilinear motion of the ring 7.

When the desired adjustment has been completed and the key is withdrawn, spring 13 pushes the pinion into the position shown in Fig. 2, thereby causing pinion teeth 11 to again engage the flutes or teeth 17 automatically to lock the screw nut and thus fixing the axial position of cone 8 in relation to the male cone member 2.

As will be apparent from the foregoing, one man, with a simple tool, can effect the desired adjustment with ease and convenience and when the adjustment is completed the mere withdrawal of the tool or key will lock the parts in the desired set position.

It will of course be understood that any other suitable devices may be utilized for moving the annular adjusting nut. However, it is desirable to provide, as in the form of the invention shown, a movable device which can be easily combined with a locking device, so as to simplify, as much as possible, the operations necessary for adjustment and also effect locking automatically. By the arrangement described, accidental consequences caused, for example, by the omission to lock the screw nut 5 after regulating it are avoided. Further, it is desirable, as in the embodiment shown, that the centrifugal force acting on the pinion during the rotation of member 2 of the clutch should push on and maintain the pinion in the locked position in order to avoid any risk of accidental unlocking.

It will of course be understood that minor changes in the form, proportion, and arrangement of parts may be resorted to within the scope of the appended claims.

I claim:

1. A friction cone clutch, including, clutch members movable axially toward and from each other, a friction cone socket-carrying annular support mounted for relative axial movement on one of said members, and means carried by said latter member for moving said support toward and from the other clutch member, said means comprising an annular adjusting ring movably interengaged at one end with the support and a spring-projected radially disposed locking member both mounted in the clutch member having the annular support, said locking member having means which, when the said locking member is in projected position locks together the ring and the clutch member in which it is mounted, and which means, when the locking member is manually pushed inwardly to retracted position, engages the ring to impart lateral movement thereto as the locking member is rotated by manual manipulation.

2. In a friction cone clutch assembly, male and female clutch members mounted on a shaft for relative axial movement toward and from each other, said female member having a radial bore whose outer end is provided with a series of locking teeth, an annular support slidably interlocked with the female clutch member for axial movement relative thereto and carrying a friction cone socket, threads on a portion of the face of the support opposite the cone socket, a ring for shifting the support fitted in an internal recess in the female clutch member, said ring having threads mating with the threads on the support, whereby, rotary movement of the ring will impart axial movement to the support, rack teeth formed on one frontal face of the ring, an actuator pinion slidable in said radial bore, a spring for normally projecting the actuator pinion outwardly of the bore to cause it to engage with said locking teeth of the bore in the female clutch member, means for limiting the outward movement of the actuator pinion under force of its spring, said pinion having a non-circular socket for receiving a key, which, in the hand of an operator may be manipulated to depress the actuator pinion against the tension of the spring to release it from said locking teeth, and then rotate the pinion to turn the ring and thereby shift the support.

3. A friction cone clutch assembly, including, a male clutch member, a female clutch member having a radial bore provided at its mouth with relatively short pinion teeth and also having an annular flange portion, an annular cone socket-carrying support axially shiftable on the inner face of the said flange portion and having external screw threads, a ring also mounted within said annular flange portion and having screw threads mating with the threads on the support, an annular rack formed on a side face of the ring, and an elongated spring-pressed actuator pinion mounted in said bore and normally interlocked with said teeth at the mouth thereof, said pinion having a non-circular socket for receiving a key which in the hand of an operator may be manipulated to depress the pinion axially in the bore until it disengages the locking teeth of the female clutch member and then rotated to cause actuation of the ring to move the cone socket toward the friction surface of the male clutch member.

ERNEST BODMER.